Figure 2:
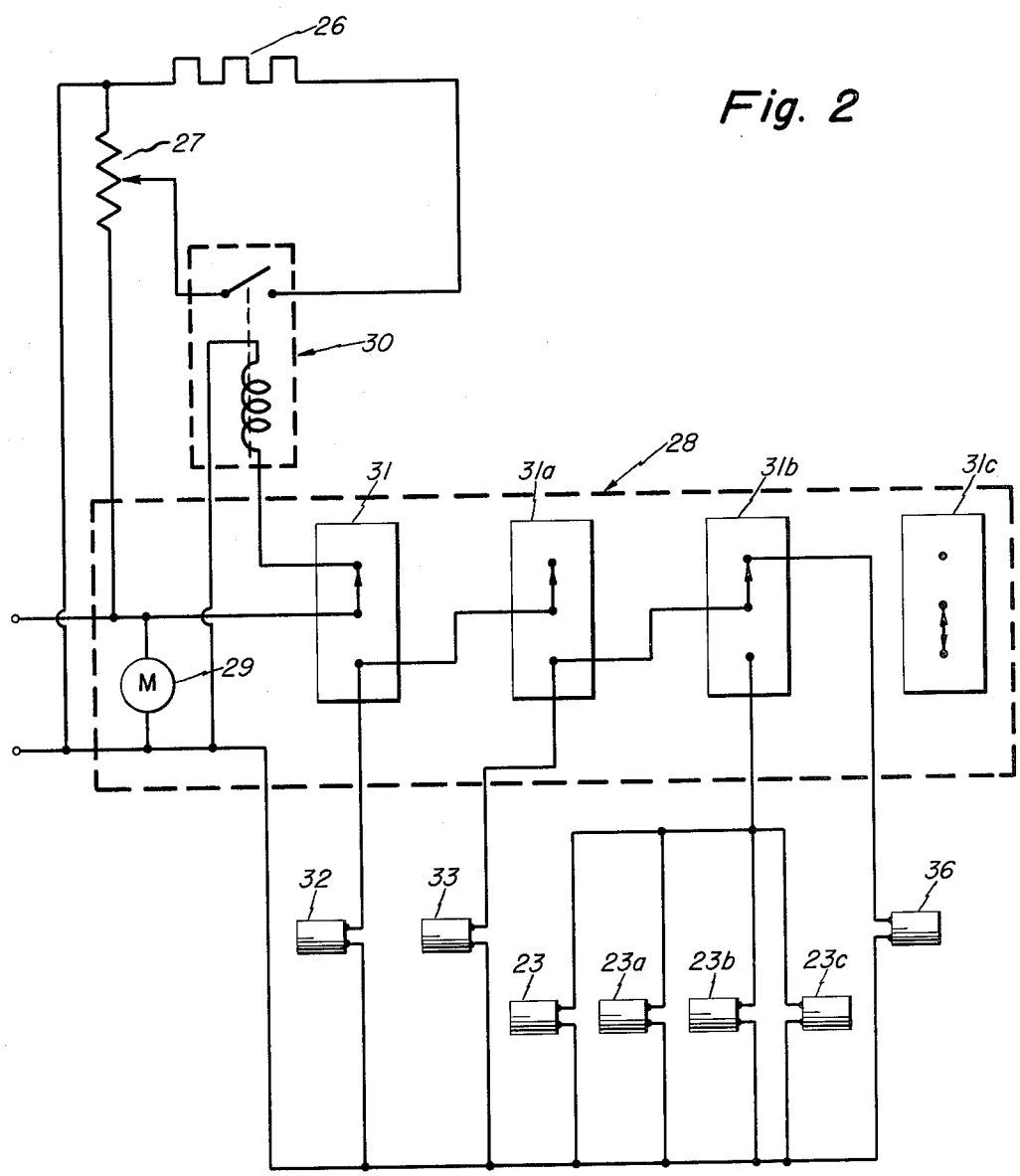

March 8, 1966     J. C. RHODES ETAL     3,239,432

AUTOMATIC CONTROL OF ANALYTICAL DISTILLATION APPARATUS

Filed Dec. 18, 1961     2 Sheets-Sheet 1

Fig. 1

INVENTORS:
Joseph C. Rhodes
Robert B. Jacobs

BY William F. McClain

ATTORNEY

United States Patent Office 3,239,432
Patented Mar. 8, 1966

3,239,432
AUTOMATIC CONTROL OF ANALYTICAL
DISTILLATION APPARATUS
Joseph C. Rhodes, Park Forest, and Robert B. Jacobs, Homewood, Ill., assignors to Standard Oil Company, Chicago, Ill., a corporation of Indiana
Filed Dec. 18, 1961, Ser. No. 159,975
6 Claims. (Cl. 202—160)

This invention relates to controlling distillation apparatus by determining the distillation properties of a mixture of liquids having different boiling points, and more particularly, it relates to apparatus for determining the distillation properties of petroleum fractions to simulate the ASTM distillation test method.

In the operation of distillation systems such as petroleum crude oil distillation units, the distillation properties of the resolved fractions are of primary importance. In such operations it is necessary that the various product fractions meet the distillation specifications set for the particular product. A variety of methods can be used in determining the composition of such products as naphtha, heater oil and furnace oil. For example, the true boiling point method can be used, but this method, while providing extremely accurate information information on the distillation properties of a sample, is very time consuming and requires expensive equipment. As an expedient, the approximate composition of such products can be obtained by other distillation methods such as the ASTM method (ASTM-D-86) which gives a relatively rough separation. Nevertheless, the above methods generally require at least a 2 to 4 hour period of time before the results from the distillation tests are obtained.

Typically, on a large crude oil distillation unit processing a large amount of crude oil per day, a sizeable amount of material may be produced during the time elapsed between taking the sample and receiving the results of the distillation tests, which material may be outside of the specification range which has been set. To avoid the loss of such off-specification material, a distillation unit generally is operated well inside of the allowable specification limits. This practice may result in a less economical operation since product fractions are usually downgraded so that some of a relatively expensive product ends up in admixture with a less expensive product being produced. Thus, it is desirable to increase the rapidity of distillation testing so that distillation units may be operated in a more economical manner and production therefrom may be optimized.

The general object of the present invention is improved control of distillation operations and apparatus for periodically obtaining accurate distillation properties of petroleum products. A further object is apparatus which simulates the above-mentioned ASTM distillation test automatically in a rapid, but accurate manner. Other more specific objects of the invention will become apparent from the following description of the present invention.

The standard ASTM distillation test consists of taking a sample of liquid, heating it at a controlled rate and condensing the vapors that are given off. The temperature of the escaping vapors is measured continuously and read by an operator at discrete times, such as when the first drop comes off (initial boiling point) or when various amounts, such as 5, 10, 20, 30, 40, etc., percent of the product is recovered. The distillation specifications are limits on temperatures at which the various amounts are recovered. The apparatus of the present invention, typically, provides information to a computer used to control a crude oil distillation unit so that the complete ASTM distillation curve is obtained from this information.

In the operation of particular distillation apparatus there are a number of important variables which govern the performance thereof. These variables and their effects are well known. For example, the feed rate of the column, the feed temperature, the draw-off rates of products, the volume and temperature of reflux, the reboiler rate, the rate and quality of stripping steam, etc. are all known to effect the column performance. Such variables are generally controlled by reference to various sensing and/or indicating means and the distillation properties of the products, and, subsequently, the pertinent variables are controlled as desired by the use of various controllers, such as valves which are electrically or pneumatically actuated.

Briefly, the present invention provides apparatus for controlling the operation of a first distillation column which apparatus comprises: means for withdrawing a product sample containing a mixture of liquids having different boiling points from said first column; a test column member; a plurality of liquid-retaining trays spaced apart vertically within said test column; a liquid sample container in flow communication with the lower portion of said test column; means for introducing a known amount of liquid sample into said container; means for vaporizing liquid sample introduced into said container; vapor riser means for passing vapors from the lower portion of said test column upwardly through said test column to intimately contact liquid retained on said trays; condensing means communicating with the upper end of said test column to condense all the vapors rising from the uppermost of said trays; means for returning the resulting condensate to the uppermost of said trays; means for maintaining the column pressure at a substantially constant pressure during a run; means for maintaining a preselected level of liquid on said trays; temperature sensing means to sense the temperatures of equilibrium vapors above the trays in said column; means for correlating the sensed temperatures with the distillation properties of a known product sample of approximately the same composition as said sample being run; and means for employing the resulting correlation to control the performance of the first column. In a preferred embodiment of the present invention thermocouples are employed to sense the equilibrium vapor temperatures and to provide electrical signals indicative of said temperatures, which signals are passed to a means for interpreting the signals in a manner which expresses the distillation curve of the sample as a mathematical function and which produces at least a second electrical signal correlatable with the temperature signals, which second signal is employed to actuate controller means affecting the column variables.

The preferred embodiment of the present invention provides apparatus which comprises a cylindrical column member; a plurality of substantially horizontal liquid-retaining trays spaced apart vertically within said column; a liquid sample container connected to the lower end of said column beneath the lower-most tray therein; heater means for vaporizing liquid sample introduced into said container, means for introducing a known quantity of liquid sample into said container; bubble cap means positioned in said trays; a condenser coil positioned above the upper-most tray within said column to condense all of the vapors rising from said upper-most tray and to return the resulting condensate to said upper-most tray; means for maintaining the pressure within said column during a run at a substantially constant pressure; liquid downcomers positioned in said trays, each of said downcomers extending to a pre-selected height above the tray in which it is positioned, and said downcomers being located across said column from the downcomers in adjacent trays; and temperature sensing means positioned adjacent said bubble caps to sense the temperatures of vapors passed upwardly through said column. The apparatus is made to operate according to a preselected timed sequence of filling, heating, draining, flushing and cooling by a timer-actuated filling means for introducing liquid sample into the sample container; a timer-actuated valved siphon, one end of which is positioned at a preselected level above the bottom of said container with the other end located exteriorly of said container; a timer-actuated valved drain in the bottom of said container; and timer-actuated valved drain lines in the bottom of each of said trays extending to the exterior of said column.

The present invention will be better understood by reference to the following description of the preferred embodiment thereof and to the accompanying drawings wherein:

FIGURE 1 is an elevational view, in partial cross-section, of the preferred embodiment of the invention; and FIGURE 2 illustrates schematically the electrical circuitry showing apparatus components to provide an automatic distillation apparatus according to the invention.

Turning now to FIGURE 1, the preferred apparatus comprises a distillation column member 11 having a plurality of substantially horizontal trays 12, 12a, 12b and 12c spaced apart vertically within the column. The trays are provided with vapor risers, such as bubble caps 13, 13a, 13b and 13c, for passing vapors from the lower end of the column upwardly through the column to intimately contact liquid retained on the trays. Other types of trays, such as perforated trays, slotted trays, etc. may be used, but bubble caps are preferred. The trays are further provided with liquid downcomers 14, 14a, 14b and 14c which extend upwardly above the trays to a preselected height. Advantageously, the downcomers in the adjacent trays, i.e., the next tray above and the next tray below, are staggered so that liquid is forced to flow across each tray and achieve better contact with the vapors. The downcomers extend downwardly at least to the liquid level of the tray below to prevent the passage of vapor upwardly through the downcomers. A liquid trap 16 is provided at the bottom of the downcomer of the lower-most tray to prevent vapors from rising upwardly through this downcomer. Temperature sensing means, such as thermocouples 17, 17a, 17b, 17c and 17d are provided adjacent each of the bubble caps to sense the temperature of the vapors rising in the column. Other sensing means, such as resistance bulb thermometers or the like may be used to sense the vapor temperatures and appropriate indicators or recorders may be used to provide a visual indication of the sensed temperatures. The thermocouples can be connected to a temperature indicator or recorder, or the electrical signal from the thermocouples may be fed directly to a computer or other means for interpreting the signals in a manner which expresses the distillation curve as a mathematical function.

Means for condensing the vapors above the upper-most tray 12, such as condenser coil 21, are provided to condense the vapors rising from the upper-most tray and to return the resulting condensate to the upper-most tray. A coolant such as water is passed through the coil at a desired temperature and rate to properly condense the vapors from the top tray in the column. An atmospheric vent line 20 is provided in the top of the column to maintain the column pressure at substantially a constant pressure, i.e., atmospheric pressure, during a run.

Each of the trays are provided with a drain line 22, 22a, 22b and 22c in the bottom thereof which line extends to the exterior of the column. A series of solenoid valves 23, 23a, 23b and 23c are provided in the drain lines so that each of the trays may be drained free of liquid at the end of a test run. These solenoid valves are timer-actuated so as to operate according to a preselected timed schedule.

The liquid sample container 19 is in flow communication with the lower end of the column 11 and may be attached to the column by a union 24 or other suitable means of achieving a seal between the two components.

A heater means 26, typically an electric resistant heater having a maximum capacity of 500 watts, is employed for heating and vaporizing liquid sample introduced into the sample container. The electrical current to the heater 26 can be adjusted by a variable resistor 27 to control the heating rate.

The apparatus is operated in a batchwise manner, the cycle being controlled by a motor driven timer 28 which operates continuously, and four signal pole double throw switches 31, 31a, 31b and 31c as shown in FIGURE 2. These switches are employed to turn the heater 26 on and off and to open the solenoid valves which control the flow of sample during the filling and draining period.

At the beginning of a cycle, switch 31 is actuated to (1) energize solenoid switch 30 and turn off the heater 26 and (2) open the siphon solenoid valve 32. Typically, after 60 seconds during which the heater and the sample container are cooled, switch 31a is actuated by the timer to open the solenoid valve 33 positioned in the filling line 34, and also to open the solenoid valve 36 in the drain line 37 from the bottom of the sample container. Relatively cool sample from a sample receiver 41 flows into the column 11 through filling line 34, cooling and condensing most of the vapors which may remain in the column and flushing the column simultaneously. The sample flows into the sample container 19 and to the drain through a cooler 42 and the drain solenoid valve 36. Typically, this flushing and cooling continues for about 90 seconds at which time the switch 31b is actuated by the timer to close the drain solenoid valve 36 and to open the tray drain solenoid valves 23, 23a, 23b and 23c, allowing any remaining liquid to flow from these trays to the drain by way of line 43. When the drain valve 36 is closed the sample container begins to fill with the incoming liquid sample. The level of liquid sample then rises in the apparatus until the level is higher than the point of entry of siphon line 44 into the system. At this time, the liquid sample begins to flow through line 44 and siphon valve 32 to drain. Approximately 90 seconds after the actuation of switch 31b, switch 31a is deactuated by the times to close the fill valve 33, and the tray drain valves 23, 23a, 23b and 23c. The liquid sample continues to flow through the siphon line 44 until the liquid level in the container is at the lowest point of the siphon line above the bottom of the sample container. Approximately 60 seconds after the deactuation of switch 31a, switch 31 is deactuated by the times to turn on the heater 26 and to close siphon valve 32. Subsequently, switch 31b is deactuated by the timer.

At the time the heater 26 is turned on there is a preselected and known volume of liquid sample in the container 19. A very small amount of liquid then remains in the distillation column due to the action of the liquid sample during the cooling and filling periods. As noted above, when the cool sample is first introduced into the apparatus the vapors at the bottom of the column condense, causing a sudden lowering of the column pressure. Liquid from the trays is drawn back through the bubble cap openings and falls onto the tray below. Most of the liquid from the trays is drained in this manner. As noted, liquid sample remaining on the trays is then drained through drain lines 22, 22a, 22b and 22c.

The sample introduced into the sample container is then heated and begins to evaporate, the vapors rising through the column by way of the bubble cap openings. The vapors continue upwardly in the column until they are condensed by the cold surface of the trays or by the condenser 21. All of the vapors leaving tray 12 are condensed and returning to this tray to provide a total reflux distillation. After operating this manner for a period of time, e.g., about 8 to 10 minutes the vapor and liquid in the apparatus attain equilibrium. At this time, switch 31c is actuated which notifies the computer to read the thermocouples, and about 90 percent of the sample is either in liquid form on the trays or in vapor form above the trays. The remainder is in the sample container 19. Vaporized sample is then rising into the column at a rate determined by the amount of heat supplied by the heater 26, and liquid is being returned to the container from the lowest tray at a rate fast enough to keep the volume of liquid in the flask constant. The liquid on the lowest tray 12c has a boiling point lower than that in the container, the liquid on tray 12b has a boiling point lower than that on tray 12c, the liquid on tray 12a has a boiling point lower than that on 12b and the liquid on tray 12 has boiling point lower than that on 12a, etc.

The degree of separation of the sample components by boiling points is a function of the efficiency of the trays. The above-described apparatus employs a separation efficiency which gives results correlated with the above mentioned standard ASTM test.

At equilibrium, the temperature of the vapor leaving each tray becomes stable. This temperature is measured by the thermocouple 17, 17a, 17b, 17c and 17d. The measured temperatures correspond to particular points obtained during the standard ASTM distillation test. The "percent off" corresponding to the temperature sensed by a particular thermocouple is a function of the amount of liquid retained on the tray and the total amount of sample employed in the distillation. In a preferred embodiment of the present apparatus, thermocouple 17 reads the 3 percent point, thermocouple 17a reads the 20 percent point, thermocouple 17b reads the 50 percent point, thermocouple 17c reads the 70 percent point and thermocouple 17d reads the 90 percent point. The heating rate, the cooling capacity of the condenser and/or the composition of the sample have only a very small affect upon the performance of the present apparatus.

The apparatus of the present invention is calibrated by representing the distillation curve as a polynomial of the form $$T = \sum_{i=0}^{4} a_i V^i$$

wherein T represents temperature and V represents "percent off." The $a_i$ are calculated for a particular sample by running a distillation on the sample and picking 5 temperature and 5 corresponding "percent off." The volume percent off read by each thermocouple is then evaluated by substituting the temperatures measured by the thermocouples 17, 17a, 17b and 17c one at a time into the above formula. Subsequently, the distillation curve which is described by the $a_i$ are computed by using the measured temperatures and the "percent off" determined in the calibration. Other techniques such as the "least squares method" are known for correlating the performance of the present apparatus with the standard ASTM distillation test, and such techniques may be used if desired.

The above described apparatus was constructed and found to have a precision of at least ±2° F. and to correlate closely with the standard ASTM distillation test. No apparent shift of the calibration was observed while the apparatus was employed on a particular product stream. However, for example if the sample stream is changed from heavy naphtha to furnace oil then different equilibrium constants must be used. In such an instance, it is necessary to perform one flushing run with the new sample in order to obtain an accurate correlation.

The foregoing description of the preferred embodiment of the present invention is given for illustrative purposes only and various modifications in the construction and operation of the above described apparatus will become apparent to the skilled artisan from a reading of the foregoing description. However, such modifications are intended to fall within the spirit and scope of the present invention.

What we claim is:

1. Apparatus for controlling the operation of a first distillation column and for determining the distillation properties of a product sample from said first column which apparatus comprises: means for withdrawing a product sample containing a mixture of liquids having different boiling points from said first column; a test column member; a plurality of liquid-retaining trays spaced apart vertically within said test column; a liquid sample container positioned below said test column and in flow communication with the bottom-most portion of said test column; means for receiving said withdrawn product sample and introducing a known amount of said product sample into said container; means for vaporizing liquid sample introduced into said container; vapor riser means for passing vapors from the lower portion of said test column upwardly through said test column to intimately contact liquid retained on said trays; condensing means communicating with the upper end of said test column to condense all the vapors rising from the upper-most of said trays; means for returning the resulting condensate to the upper-most of said trays; means for maintaining the test column pressure at a substantially constant pressure during a run; means for maintaining a pre-selected level of liquid on said trays; temperature sensing means to sense the temperatures and produce a temperature signal indicative thereof of equilibrium vapors above the trays in said test column; means for receiving said temperature signal and correlating the sensed temperatures with the distillation properties of a known product sample of approximately the same composition as said sample being run and produce on output signal relative to said correlation; and means for receiving said output signal and adjusting the control parameters of the first column in accordance with said output signal.

2. The apparatus of claim 1 wherein there is included temperature sensing means providing a series of signals indicative of the sensed temperatures; means for transmitting said signals; means for receiving and interpreting said signals and to produce at least a second signal which is a function of the distillation properties of said sample; controller means affecting the first distillation column variables; and means for transmitting said second signal to said controller means.

3. The apparatus of claim 2 wherein said temperature sensing means are thermocouples and said interpreting means is an electronic computer.

4. Distillation apparatus for automatically determining the distillation properties of a sample of liquids having definite boiling points, said determination being made according to a preselected timed schedule, which apparatus comprises: a cylindrical column member; a plurality of substantially horizontal trays spaced apart vertically within said column; a liquid sample container positioned below and in fluid communication with the lower end of said column beneath the lower-most drain therein; heater means for vaporizing liquid sample introduced into said container; bubble cap means positioned in each of said trays; a condenser coil within said column positioned above the uppermost tray to condense all of the vapors rising from said upper-most tray and to return the resulting condensate to said upper-most tray; an atmospheric vent extending from said column above said coil; liquid downcomers positioned in each of said trays, each of said downcomers extending to a preselected height above the tray in which it is positioned, and each of said downcomers being positioned circumferentially from downcomers in adjacent trays; timer-actuated valved drain lines in the bottom of said trays, said drain lines extending to the exterior of said column; a timer-actuated filling line connectitng with said sample container; a timer-actuated valved siphon having one end thereof positioned at a preselected level above the bottom of said container; a timer-actuated valved drain line in the bottom of said container; and temperature sensing means positioned adjacent said bubble caps to sense the temperatures of vapors passing upwardly through said column and to provide a series of electrical signals indicative of said sensed temperatures;

and timer means adapted to continuously control the sequence of operation of said apparatus which sequence comprises actuating and causing to open said syphon, said filling line, and said drain line, after a time sufficient to drain said container and to allow fresh sample to enter said container, said timer means then actuates and causes to open said tray drain lines and simultaneously actuates and causes to close said drain line allowing any sample remaining on said trays from the previous cycle to drain therefrom while also allowing said entering sample to fill said container until the level of said sample rises higher than the entry point of said syphon establishing sample flow through said syphon, after a time at least sufficient to establish flow through said syphon, said timer means then actuates and causes said filling line to close and simultaneously actuates and causes to close said tray drain lines, and after sufficient time for said sample level to fall below said syphon entry point causing flow through said syphon to cease, said syphon is then actuated and caused to close by said timer means.

5. Distillation apparatus for determining the distillation properties of a sample of liquids having definite boiling points which apparatus comprises:
a cylindrical column member;
a plurality of substantially horizontal liquid retaining trays spaced apart vertically within said column;
a liquid sample container provided with a timer-actuated valved siphon having one end thereof positioned at a preselected level above the bottom of said container, and said container being positioned below and in fluid communication with the lower end of said column beneath the lowermost tray therein;
heater means for vaporizing liquid sample introduced into said container;
a timer-actuated valved filling line for introducing a known quantity of liquid sample;
bubble cap means positioned in the said trays;
a condenser coil within said column positioned above the uppermost tray to condense all of the vapors rising from said upermost tray and to return the resulting condensate to said uppermost tray;
means for maintaining the pressure within said column at a substantially constant pressure during the run;
a liquid downcomer positioned in each of said trays, each of said downcomers extending to a preselected height above the tray in which it is positioned, each of said downcomers being located across said column with respect to the downcomer on each immediately adjacent tray;
means for draining all of the liquid from said trays at the end of a run;
temperature sensing means positioned adjacent said bubble caps to sense the temperatures of vapors passed upwardly through said column and to provide an indication thereof;
timer means adapted to continuously control the sequence of operation of said apparatus which sequence comprises actuating and causing to open said syphon, said filling line, and said drain line, after a time sufficient to drain said container and to allow fresh sample to enter said container, said timer means then actuates and closes said drain line allowing said entering sample to fill said container until the level of said sample rises higher than the entry point of said syphon establishing sample flow through said syphon, after a time at least sufficient to establish flow through said syphon, said timer means then actuates and causes said filling line to close, and after sufficient time for said sample level to fall below said syphon entry point causing flow through said syphon to cease, said syphon is actuated and caused to close by said timer means.

6. The apparatus of claim 5 wherein said means for draining said trays are timer-actuated valved drain lines in the bottom thereof, said tray drain lines extending to the exterior of said column, and wherein said tray drain lines are actuated and caused to open by said timer means simultaneously with the closing of said container drain line and are actuated and caused to close by said timer means simultaneously with the closing of said filling line.

References Cited by the Examiner

UNITED STATES PATENTS

| 1,426,346 | 8/1922 | Berthelon | 202—160 X |
| 2,022,809 | 12/1935 | Kramer | 202—160 |
| 2,252,550 | 8/1941 | Bragg | 202—160 |
| 2,350,006 | 5/1944 | Wolfner | 202—160 X |
| 2,662,850 | 12/1953 | Kraft | 202—158 |
| 2,666,737 | 1/1954 | Hurd | 202—158 X |
| 2,843,714 | 7/1958 | Stanton | 202—160 |
| 3,018,230 | 1/1962 | Morgan | 202—160 X |
| 3,094,468 | 6/1963 | Topham | 202—160 |

FOREIGN PATENTS 808,965   2/1959   Great Britain.

OTHER REFERENCES

"Instruments and Process Control," New York State Vocational and Practical Arts Association, 1945, pp. 168–170.

NORMAN YUDKOFF, *Primary Examiner.*

GEORGE D. MITCHELL, ALPHONSO SULLIVAN,
*Examiners.*